Oct. 4, 1966    C. D. CALHOON, SR., ETAL    3,277,473
DIGITAL TECHNIQUE FOR DETERMINING UNAMBIGUOUS
INFORMATION FROM AMBIGUOUS INFORMATION
Filed Dec. 9, 1963    2 Sheets-Sheet 1

INVENTORS.
CHARLES D. CALHOON, SR.
HENRY J. CICHANOWICZ
BY
H. H. Losche
ATT'YS.

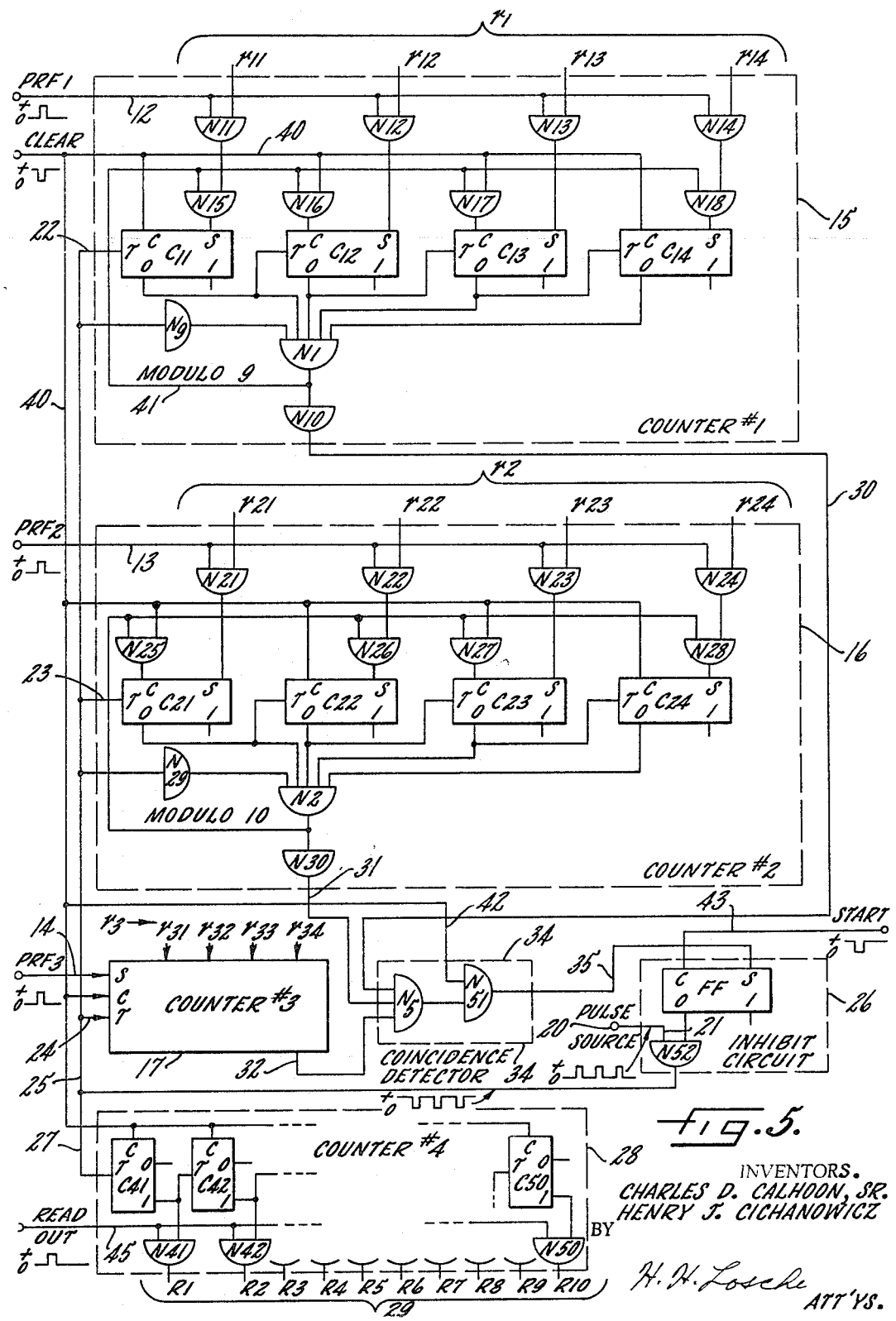

3,277,473
DIGITAL TECHNIQUE FOR DETERMINING UNAMBIGUOUS INFORMATION FROM AMBIGUOUS INFORMATION
Charles D. Calhoun, Sr., Catonsville, Md., and Henry J. Cichanowicz, Galion, Ohio, assignors, by mesne assignments, to the United States of America as represented by the Secretary of the Navy
Filed Dec. 9, 1963, Ser. No. 329,326
9 Claims. (Cl. 343—13)

This is a continuation-in-part of our patent application of the same title, Serial No. 13,407, filed March 7, 1960, now abandoned.

This invention relates to circuit means for determining an unambiguous time interval from a plurality of ambiguous time intervals and more particularly to a digital counting technique for producing unambiguous range resolution from range ambiguities by the use of a plurality of pulse repetition frequencies in a pulse Doppler radar ranging system.

With the coming of modern weapons systems and tactics it has become necessary to increase the detection capabilities and speed of data processing of radar systems. The pulse Doppler radar system has been found to offer advantages in detecting and discriminating between low flying targets and other long range targets but inherently, due to the need for high pulse repetition frequencies, has range information in ambiguous form. In order to obtain continuous velocity information, the pulse Doppler radar must utilize a pulse repetition frequency (PRF) which is higher than the Doppler frequency shift associated with the closing velocity of present day high speed targets. When this PRF is increased to a point where later transmitted pulses occur prior to the return of the first echo pulse of a target object, the radar is unable to determine to which of the transmitted pulses the echo pulse corresponds thus giving an ambiguous range measurement result. In order to associate the proper echo signal to get true range, Doppler radars have been modified to have secondary modulations in the form of multiple pulse repetition frequencies in order to provide for resolution of the ambiguity in range measurement information. Any desirable number of PRF's of two or more may be utilized, each having a very high PRF from which ambiguous range information may be acquired and used to determine the true range information, as by averaging or co-relating the pulse information to obtain true range measurement. While true range measurement information has been obtained in the above manner, there is still a definite need and much to be desired in obtaining true range information from pulse Doppler radar in a compact, efficient, and accurate manner.

In the present invention, range information is obtained by secondary modulation of a pulse Doppler radar transmitter-receiver system with a plurality of PRF's, which PRF's are related in a special way and are harmonics of a fundamental PRF, the latter of which is chosen to have an interpulse interval greater than the detection range desired of the radar. The resulting range information from each of the PRF's will, of course, be ambiguous range information. This ambiguous range information is used to set a comparable number of digital counter circuits which are simultaneously pulsed at a predetermined pulse rate to cause the plurality of counters to count down in repeated cycles until there is coincidence in the count. This same pulse source that pulses the counters likewise is applied to an output digital counter which counts upward until coincidence of the plurality of counters occurs at which time the plurality of counters operates through a coincidence circuit and an inhibiting circuit to block further count of the output counter. The output counter therefore produces a count as a digital expression of the true or unambiguous range of the target object illuminated by the plurality of PRF's of the pulse Doppler radar. It is, therefore, a general object of this invention to provide a means for utilizing the ambiguous range signal information of a plurality of PRF's received as echo signals of a target object from a pulse Doppler radar system to produce unambiguous range signal information of the target object illuminated by the radar.

These and other objects and the attendant advantages, features, and uses of this invention may become more apparent to those skilled in the art as the description proceeds when considered along with the accompanying drawings in which:

FIGURE 5 illustrates in block diagram the counters, coincidence detector, and inhibit circuits shown in the general block diagram in FIGURE 1.

Figure 1:
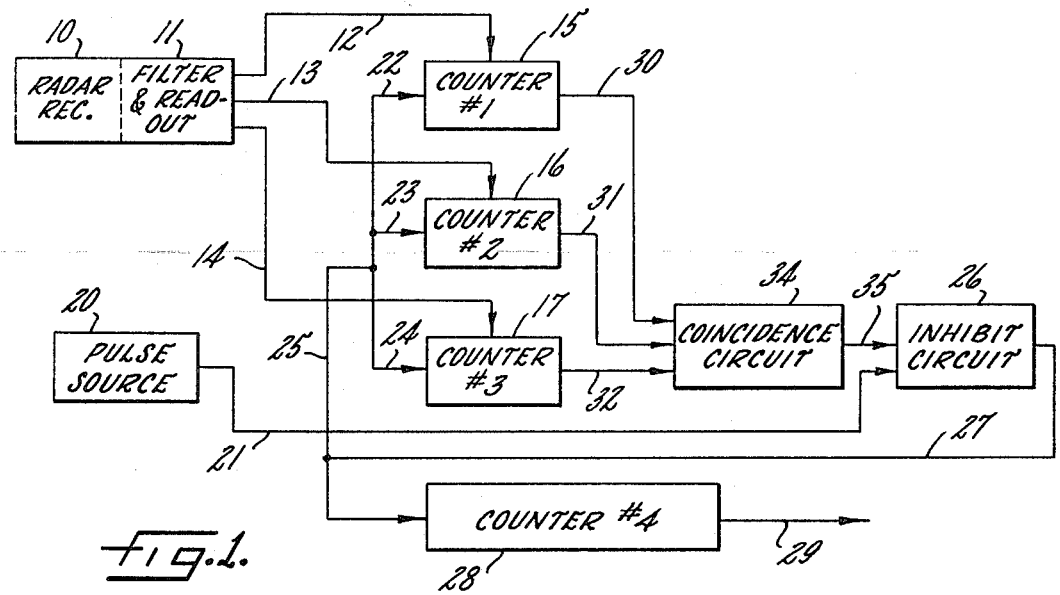
FIGURE 1 illustrates the invention in a general block and functional circuit diagram of the preferred form used.

Referring more particularly to FIGURE 1, there is illustrated in a general block diagram a pulse Doppler radar receiver 10 which includes filter and readout circuits 11 as may be well understood by those skilled in the art to product, for the example herein, three range outputs on the functional leads 12, 13, and 14, of ambiguous ranges $r1$, $r2$, and $r3$, respectively. The ambiguous ranges $r1$, $r2$, and $r3$ are each applied over the functional leads 12, 13, and 14 in binary digital form as a digital word to be entered in the counters. The radar 10 and the filter and readout circuits 11 are of the digital receiver type in which a digital counter of Doppler frequency counts and stores the digital count until readout for each PRF. The digital bits read out of each digital counter constitute a digital "word" for each ambiguous range $r1$, $r2$, and $r3$. The digital word readout for $r1$ to functional lead 12 sets the bits of counter #1 corresponding to the bit sequence read out, the digital word readout for $r2$ on functional lead 13 sets counter #2, and the digital word readout for $r3$ on functional lead 14 sets counter #3, as will later become clear. In carrying out this invention it is necessary that the transmitted PRF's be harmonics of a fundamental frequency ($f_0$) with the order of harmonics being related in a special way, as for example:

$PRF_1 = (N_1)(N_2)f_0$
$PRF_2 = (N_1)(N_3)f_0$
$PRF_3 = (N_2)(N_3)f_0$ where $(N_1)$, $(N_2)$ and $(N_3)$ are integers or moduli which are relatively prime by pairs such as for example, where $(N_1) = 11$
$(N_2) = 10$
$(N_3) = 9$ Modulo, as used in this description, is an integer or whole number, $N_1$ being modulo 11, $N_2$ being modulo 10, and $N_3$ being modulo 9. This particular relation among the PRF's will permit a resolution of the range ambiguities, as should later become clear. The radar receiver 10 is range gated in a manner well understood by those skilled in the radar art to determine the time of arrival of a target echo only with respect to the last transmitted pulse preceding the arrival of the echo pulse. The true range of the target is expressed ambiguously for the respective PRF's as $$R = k_1 T_1 + r_1 \quad (1)$$

where:

$R$ = true range expressed in terms of ambiguous range
$T_1$ = interpulse interval
$r_1$ = range gate position within interpulse interval
$k_1$ = multiple time around factor.

$r1$, $r2$, and $r3$ are ambiguous range signals each corresponding to $r_1$ in the above formula which range signals are applied to outputs each in the form of a digital number or digital word from the filter and readout circuits 11 of the radar system.

Figure 2:
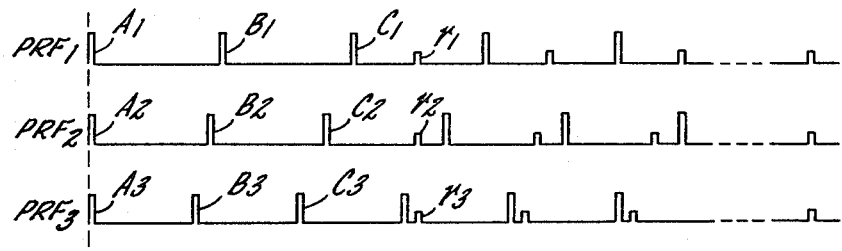
FIGURE 2 illustrates the waveforms of transmitted and echo pulses of three PRF's used in a pulse Doppler radar in accordance with this invention.

According to this invention and particularly referring to FIGURE 1, with occasional reference to FIGURE 2, three digital counters, #1, #2, and #3, illustrated by the respective reference characters 15, 16, and 17, are coupled respectively to receive the ambiguous range digital number outputs $r1$, $r2$, and $r3$, coming by way of functional leads 12, 13, and 14, to set each counter in a digital numerical condition corresponding to the ambiguous range input, as will be more fully described with reference to FIGURE 5. A pulse source or frequency generator 20, which is stabilized in frequency by crystal or other stabilization means, produces pulses on output 21 thereof at a frequency equal to the product of the integers or moduli ($N_1$), ($N_2$), and ($N_3$) and the fundamental frequency which may be expressed by Formula 2.

$$f_D = (N_1)(N_2)(N_3) f_0 \quad (2)$$

The output 21 of the pulse source 20 is applied through an inhibit circuit 26 over conductor 25 to the three counters 15, 16, and 17, by way of conductors 22, 23, and 24, to cause each counter to count downward from its set condition by the range information $r1$, $r2$, and $r3$, respectively, as will be more fully described with reference to FIGURE 5, it being desired in connection with FIGURE 1 to provide a general description of the circuit and its intended purpose. Also, the output 21 of the pulse source 20 is conducted through the inhibit circuit 26 and conductor means 27 to an output counter, herein identified as counter #4 and identified by the reference character 28. In the normal uninhibited condition of the inhibit circuit 26, pulses from the pulsed source conducted through the inhibit circuit 26 and the conductor means 27 to be counted by the output counter #4 will be available on the output of this counter to be applied by way of the output conductor means 29 to subsequent related circuitry for information or use of the range digital information. The output counter #4 is a series counter capable of serially adding the pulse count of the pulse generator 20. This counter is capable of accumulating binary count as disclosed in Fundamentals of Digital Computers by Mathew Mandel (1958), pages 92 and 93, and of being reset to start a new count.

The outputs of counters 15, 16, and 17 are coupled in parallel by way of the output conductors 30, 31, and 32, respectively, to a coincidence detector 34. The output of the coincidence detector 34 is conducted by way of the conductor means 35 to the inhibit circuit 26 to control same to block the pulses of pulse source 20 through 25, 27 from the inhibit circuit whenever the coincidence detector 34 becomes electronically active; that is, when there is coincidence in output among counters #1, #2, and #3, this coincidence will be detected in the detector 34 to activate the inhibit circuit 26 thereby blocking the pulses out through 25 to the counters #1, #2, and #3 and out through 27 to counter #4.

To illustrate the relationship of the transmitted PRF's and the echoes from these PRF's, FIGURE 2 illustrates each PRF transmission from an initial pulse A1, A2, and A3, respectively. The initial pulses produce echo pulses $r1$, $r2$, and $r3$ each after other preceding transmitted pulses B and C although in actual practice there may be many more preceding transmitted pulses. Succeeding range information $r1$, $r2$, and $r3$ may come by the succeeding transmitted pulses B and C as well understood by those skilled in the radar art. Where different pulse repetition frequencies are used, a different interpulse interval will exist between A1, B1, C1; A2, B2, C2; and A3, B3, C3 transmitted pulses, as shown in FIGURE 2.

Figure 3:
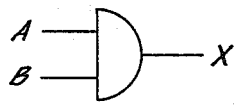
FIGURE 3 illustrates a two-input NAND gate with a truth table therefor.
Figure 4:
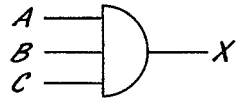
FIGURE 4 illustrates a three-input NAND gate with a truth table therefor.

Referring more particularly to FIGURES 3, 4, and 5, the general circuit block illustration of the counters, coincidence detector, and inhibit circuit of FIGURE 1 is shown in FIGURE 5 utilizing NAND gates as illustrated in FIGURES 3 and 4. FIGURES 3 and 4 have truth tables therein for familiarization and ready reference in the understanding of the logic of the FIGURE 5 circuit. In referring to FIGURE 5 it is to be understood that the invention, shown in general block diagram in FIGURE 1, and a more specific block diagram in FIGURE 5, must operate in a manner compatible with the timing sequences produced by the radar receiver 10. For the purpose of explanation it will be assumed that the radar does not utilize three PRF's simultaneously, but that they are used sequentially. Hence, the ambiguous range values $r1$, $r2$, and $r3$ will be available from the filter and readout circuits 11 in parallel binary form at respective discrete time intervals established by the radar. Accordingly, the timing sequence of pulses available from the radar are utilized as shown in FIGURE 5, these being (1) clearing pulses, (2) PRF 1, PRF 2, and PRF 3, pulses, (3) start pulses, and (4) readout pulses. It is also to be understood that bistable multivibrators are utilized along with the NAND gates which operate at low voltage levels of an unspecified positive voltage and zero volts. The bistable multivibrators have set (S), clear (C), and toggle (T) inputs all of which are alternating current (A.C.) coupled through means to be triggered only by an input signal which is changing from the positive logic level to the zero level. The toggle (T) inputs to the bistable multivibrators are coupled in the circuit to cause the circuit to change to the alternate state with each applied pulse.

Referring more particularly to counter #1 of FIGURE 5, there is shown four bistable multivibrator binary counters identified as C11, C12, C13, and C14 although a greater number of these counters could be utilized, as desired. Each binary counter has three inputs, one for clearing the binary counter at terminal C, one for setting the state of the counter at terminal S, and the other for switching the state of the counter at terminal T. Also, each counter has two outputs designating the binary function of whether the counter is in the "0" state or the "1" state. Each of the "1" state terminals are stubbed and each of the "0" state terminals are coupled as an input to a NAND gate N1. The "0" state output of C11 is coupled to the T input of C12, the "0" state output of C12 is coupled to the T input of C13, etc., for the remaining binary counter multivibrators. A digital word representative of $r1$ or the ambiguous range from the radar and the PRF 1 signal of the radar coming by way of the functional lead 12 in FIGURE 1 are applied through NAND gates N11, N12, N13, and N14 to the S input terminal of the counters C11, C12, C13, and C14, respectively. The digital word of the ambiguous range $r1$ consists of the digital bits $r11$, $r12$, $r13$, and $r14$, the counters C11 through C14 being increased or decreased in number to always accommodate the digital bits $r11$ through $r14$, as desired or necessary. In the digital counter #1, the digital bits $r11$ and $r14$ must likewise pass through NAND gates N15 and N18 while the digital bits $r12$ and $r13$ pass only through NAND gates N12 and N13 to the S input of the respective counters C12 and C13. The C inputs of counters C12 and C13 are coupled through NAND gates N16 and N17, respectively, from the clearing signal from the radar by way of the conductor means 40 as one input and from the output of a gate N1 coming by way of conductor means 41 as a second input to NAND gates N16 and N17. The T input to the counter C11 is by way of conductor 22 from the pulse source 20 through conductor means 21 and 25, this pulse source also being applied as the fifth input to gate N1 through a NAND gate N9. It may be seen by the above-described connections that digital counter #1 has inputs to the C and S terminals of the counters C11 through C14 in such a manner that when a signal from the output N1 over the conductor means 41 is produced, it is capable of setting the counters in accordance with modulo 9 in that these counters would be set in the digital sequence 1 0 0 1 being equivalent to the decimal number 9, the counters C11 through C14 being in reverse order of the normal numerical sequence.

Digital counter #2 is constructed quite similar to digital counter #1 with the exception that the ambiguous range $r2$ to digital counter #2, represented by the digital bits $r21$, $r22$, $r23$, and $r24$, are applied to this counter upon read-in by the PRF 2 signal over the functional lead 13 as shown in FIGURE 1. Another instance in which digital counter #2 differs from digital counter #1 is that the NAND gates N25, N26, N27, and N28 receiving the reset from the NAND gate N2 in the modulo 10 is such that the input to C21 is to the C terminal, the input to C22 is to the S terminal, the input to C23 is to the C terminal, and the input to C24 is to the S terminal, to provide the digital number 0 1 0 1 equal to the decimal number 10 providing the modulo 10 required.

Digital counter #3 is shown in block since it is constructed in a similar manner to digital counters #1 and #2 with the exception that the ambiguous range $r3$ applied in digital bits by $r31$, $r32$, $r33$, and $r34$ and the PRF 3 signal applied over functional lead 14 sets the ambiguous range into this counter. Digital counter #3 also differs in that its binary counters will be coupled from the output of the five digital input NAND gate, corresponding to NAND gates N1 and N2, to produce the modulo 11 for the resetting sequence of this counter. Digital counter #3 accordingly has the inputs S, C, and T in the same manner as shown and described for digital counters #1 and #2.

The output from the NAND gate N1 is through a NAND gate inverter N10 over the conductor means 30 as one input to the coincidence detector 34. The output of the NAND gate N2 is through a NAND gate inverter N30 to conduct this output over the conductor 31 as a second input to the coincidence detector 34. In like manner, digital counter #3 has the output 32 thereof coupled as a third input to the coincidence detector circuit 34. The coincidence detector includes a NAND gate N5 and a NAND gate N51, the three inputs 30, 31, and 32 being into the NAND gate N5, the output of which is one input to the NAND gate N51. The second input to NAND gate N51 is from the clearing pulse source from the radar coming by way of conductor 40 and branch conductor 42. The output of the NAND gate N51, being the output of the coincidence detector 34 is by way of the conductor means 35 to the S terminal of a bistable flip-flop circuit FF in the inihbit circuit 26. The C terminal of FF is coupled by way of conductor 43 to receive a "start" signal from the radar. The "1" state output of FF is stubbed and the "0" state output of FF is coupled as one input to a NAND gate N52, the output of which is by way of conductor 25 and branch conductors 22, 23, 24, and 27, to the T inputs of the digital counters #1, #2, #3, and #4. The second input to NAND gate N52 is from pulse source 20 by way of conductor 21. Pulse source 20, as set forth in the description of FIGURE 1, is from the pulse generator which generates a continuous pulse train stabilized in frequency by crystal or other means to provide what is often referred to as "clock" pulses for binary and digital counter means. The pulse source 20 provides a continuous pulse train which also synchronizes the "start" pulse in order that the first pulse to the counter is a full pulse, as will later become clear in the description of operation of FIGURE 5.

Digital counter #4 consists of a plurality of binary counters C41, C42, C43, etc., through C50, as shown partially in detailed blocks and partially in an overall block, to provide a ten digital bit counter, although a more or less digital bit counter may be utilized as desired or necessary. Each binary counter C41, C42, etc., has an input terminal C for clearing, T terminal for toggle, and two output terminals providing the binary state of "0" and "1." Each "0" state output is stubbed and each "1" state output is coupled to the toggle input of the next higher order digital binary counter; that is, the "1" state output of C41 is coupled to the terminal T of C42, the "1" state output of C42 is coupled to the input T of C43, etc., to the last binary counter C50. The "1" state output of C41 is also coupled as one input to a NAND gate N41, the "1" state output of C42 is coupled as one input to NAND gate N42, the "1" state output of C43 is coupled as one input to NAND gate N43, etc., throughout the remaining binary counters to C50 where the "1" state output of C50 is coupled as one output to a NAND gate N50. A second input to each of the NAND gates N41 through N50 is coupled to a conductor 45 to which is applied "readout" pulses from the radar. The outputs from the NAND gates N41 through N50 are designated as R1, R2, R3, through R10, respectively, R1 through R10 providing the digital counter "readout" to conductor means 29 designating the unambiguous range in binary counter word form.

The sequence and functions of timing and control pulses originating in the radar synchronizer are: (1) clearing pulses coming by way of conductor means 40, being a negative-going pulse sequence from plus-to-zero and back to plus; (2) PRF 1 pulse, being a positive-going zero-to-plus-to-zero pulse over conductor means 12; (3) PRF 2 pulse, being a positive-going zero-to-plus-to-zero pulse applied over conductor means 13; (4) PRF 3 pulse, being a positive-going zero-to-plus-to-zero pulse applied over conductor means 14; (5) "start" pulse, being a negative-going plus-to-zero-to-plus pulse, and (6) "readout" pulse, being a positive-going zero-to-plus-to-zero pulse applied over conductor 45. These pulses are all shown in FIGURE 5 under the conductor means to which they apply.

*Operation*

In the operation of the device shown in FIGURE 5, the first pulse for operation is the clearing pulse from the radar which is a negative going positive-to-zero-to-positive pulse which clears all four counters to their respective "0" states and sets the inhibit circuit to inhibit the passage of pulses therethrough. For the moment, referring to digital counter #1, the clearing pulse is applied to C11 at terminal C clearing this counter to the "0" state. The clearing pulse is also applied as one input to N16 the output of which is to the C terminal to clear C12 to the "0" state. The second input to N16 is by way of conductor means 41 which is resting in its positive condition. The NAND gate N16 operates in the manner and in accordance with the logic as shown in FIGURE 3. The input from conductor 41 is standing in the plus condition, as will later be made clear, and the clearing pulse will go from plus-to-zero-to-plus producing an output on N16 of zero-to-plus-to-zero. As hereinbefore stated, the bistable multivibrators are coupled to be triggered by an input signal which is changing from a positive logic level to the zero level. Since the output of N16 changes from plus-to-zero when the clearing pulse is changing from zero-to-plus, counter C12 will be cleared to its "0" state. The same is to be said for the logic of N17 for clearing C13. C14, like C11, will be cleared since the clearing pulse is applied directly thereto and the plus-to-zero portion of the clearing pulse will clear these multivibrators. The clearing pulse will likewise clear counters #2, #3, and #4 so that all counters are placed in their "0" state. The clearing pulse applied by way of conductors 40 and 42 will likewise be applied to the NAND gate N51 in the coincidence detector 34. When the inputs to NAND gate N5 are not in coincidence, as would be the case in initially starting this counter circuit, the output of N5 will be resting in the plus condition, as may be seen from FIGURE 4. When the clearing pulse of plus-zero-plus is applied to NAND gate N51, a zero-plus-zero will be produced on its output, the latter two conditions, plus and zero, being applied through the conductor 35 to the S terminal of FF in the inhibit circuit 26 to set this circuit in its "1" state. N52 is therefore set to inhibit the pulses from source 20 from passing therethrough, this pulse source being a series of positive going clock pulse. Since the zero condition is placed on the N52 gate by the "1" state of FF, the pulses from pulse source 20 going from zero-to-positive-to-zero are ineffective to establish a positive-to-zero condition on the output 25, 27. This output will be held in the plus condition, therefore, no pulses will pass the inhibit circuit 26 from the pulse source 20.

Next, the radar produces the PRF 1 signal to the counter #1 with the ambiguous range $r1$ (digital bits $r11$ through $r14$) impressed on the NAND gates N11 through N14. The digital bits $r11$ through $r14$, being the ambiguous range, may be changing momentarily and accordingly, will be entered into the counters C11 through C14 in accordance with their binary state. As an example, let it be assumed that $r11$ is first in the state having no signal thereon. When PRF 1 is applied, the second input to N11 will be the pulse as shown under the PRF 1 conductor which will change in condition on the second input to N11 from zero-to-plus-to-zero which, with the zero voltage condition on the second input, will produce on the output of N11 an unchanging plus condition as may be determined from the logic in FIGURE 3. N11 will then block any signal to counter C11. Let it now be assumed that $r11$ is in the "1" binary state in which this input to N11 is setting in the plus condition. PRF 1 pulse will now produce on the output of N1 the plus-to-zero-to-plus condition, the plus-to-zero condition being sufficient to trigger C11 to its "1" state. In order for the output of N11 to get to the S terminal of C11 it must also pass through NAND gate N15. As long as gate N1 has different input conditions existing on it from the counters C11 through C14 and from the pulse source 20, its output will remain in the plus condition, as may be determined from the logic of FIGURE 4, it being readily deduced from the FIGURE 4 example the outputs for a five input NAND gate on output conditions being in the plus condition except where all plus condition inputs are placed on the five inputs of N1. Therefore, the output of N1 being in the plus condition applied over conductor 41 has one input to N15 in the plus condition, and the input from N11 being from the plus-to-zero-to-plus condition will produce on the output of N15 the zero-plus-zero condition, the latter two conditions of plus-to-zero being sufficient to trip C11 to its "1" state. This same logic can be applied for the inputs of all the digital bits $r12$, $r13$, and $r14$ to set the respective counters C12, C13, and C14 in accordance with whether the digital bits $r12$, $r13$, and $r14$ are applied in their "0" state or "1" state.

PRF 2 will likewise, and with the same logic, enter the ambiguous range $r2$ for the digital bits, $r21$ through $r24$, into the counters C21 through C24. Also, in like manner PRF 3 will enter the ambiguous range $r3$ into the binary counters of the digital counter #3. It is to be understood that during this time counter #4 remains in its "0" state since inhibit circuit 26 has the pulse source 20 blocked from passing therethrough.

The next pulse applied to the circuit will be the "start" pulse over conductor 43 which is directly coupled to the C terminal of FF in the inhibit circuit to set this FF circuit in its "0" state whereupon a plus condition from the "0" state output of FF will be applied as one input to the NAND gate N52. Since this input rests in the plus condition the pulse source from 20 will be applied in pulses of zero-plus-zero which will produce full and complete pulses from plus-to-zero-plus on the output of N52. These pulses are applied to the T input of C11 in counter #1, the T input of C21 in counter #2, the T input of counter #3, and the T input of C41 in counter #4. These pulses cause the counters #1, #2, and #3 to count down from the ambiguous range digital counts set into these counters while at the same time counter #4 will count upward and accumulate the counted pulses. If, for example, as counter #1 counts downward, it will only count to zero at which time C11 through C14 will all come to the "0" state at which time the plus condition from C11 through C14 will be applied to the NAND gate N1. The pulses from pulse source 20 now coming in the inverted condition through NAND gate N9 will be inverted to produce the zero-to-plus-to-zero condition on the fifth input to N1 so that when there is coincidence of plus conditions on each input to N1, N1 will go from plus-to-zero-to-plus. Conductor 41 will apply this plus-to-zero-to-plus signal to NAND gates N15, N16, N17, annd N18 to set the counter #1 in the 1 0 0 1 condition corresponding to modulo 9. Plus-to-zero-to-plus will pass through N15 because the second input to N15 is resting in its plus condition. The same is true for the second input to N16, N17, and N18. In like manner, when a coincidence of all plus conditions exist on the five inputs of N2, as when C21 through C24 have counted down to zero, the signal for modulo 10 will set counter #2 to 0 1 0 1 equivalent to decimal 10. Also, in like manner, counter #3 when it has counted down to its "0" state, will be set in accordance with modulo 11. As the pulses continue from the source 20, counters #1, #2, and #3 will each count down and reset to their modulo until coincidence occurs on the outputs 30, 31, and 32 from counters #1, #2, and #3, respectively, at which time the output of gate N5 will go from its plus condition to its zero condition to its plus condition. Since the second input from the clear pulse source 40, 42 is resting in its pulse condition, the output of N5 will produce a pulse on the output of N51 from the zero-to-plus-to-zero condition, the latter two conditions, plus to zero, being effective to set the multivibrator FF in its "1" state thereby producing a zero voltage input to N52 thereby providing an inhibit to the passage of the clock pulses from the pulse source 20. This leaves an accumulated number in counter #4 which will now be read by a "readout" pulse from the radar coming by way of conductor 45 applied to the NAND gates N41 through N50. As may be readily seen, any counter, C41 through C50, which is in the "1" state, will produce a plus condition on its respective NAND gate which will allow this digital bit to be gated through by the "readout" pulse on the respective R1 through R10 digital bits to the output 29. The digital word or count output on the output 29 of counter #4 is representative of the unambiguous range as deduced in the simultaneous solution of equations made from Formula 1. Therefore, coincidence of the counters #1, #2, and #3 in the count down originally from the ambiguous ranges set therein and thereafter from their set modulo will produce a binary count exemplary of the unambiguous range of a target used with multiple PRF radar systems.

While many modifications and changes may be made in the constructional details and features of this invention to arrive at the teachings set forth by this invention, it is understood that we desire to be limited only by the spirit and scope of the appended claims. Likewise, it is to be understood that other integer or modulo relationships may be used in choosing the harmonic PRF's and fundamental frequency without departing from the spirit of this invention. Accordingly, we wish to be limited only by the scope of the appended claims.

We claim:
1. A digital counting means for determining the true time interval of pulse echoes for range measurement of a target from multiple pulse repetition frequencies of radar, each giving ambiguous time interval counts comprising:
  a plurality of digital counters corresponding in number to the pulse repetition frequencies;
  means setting each of said plurality of digital counters in accordance with the ambiguous count of each corresponding pulse repetition frequency;
  a final digital counter;
  first means applying pulses to said plurality of digital counters and to said final digital counter, said plurality of digital counters counting said pulses from said ambiguous count in each to a predetermined count of each at which time the respective counter will produce an output signal coupled and operative to reset said digital counter to a predetermined modulo count, repeated counting in each said digital counter continuing until a coincidence of output signals occurs for all digital counters producing a coincidence signal; and
  second means controlled by said coincidence signal to block further application of said pulses to said final digital counter whereby the final count of said final digital counter is an unambiguous count of pulses representing a time interval.

2. A digital counting means as set forth in claim 1 wherein said second means controlled by said coincidence signal is a coincidence detector circuit coupled to an inhibit circuit for the first means applying pulses to said final digital counter.

3. A digital counting means as set forth in claim 2 wherein said first means applying pulses is a pulse source precisely controlled in pulse repetition frequency.

4. A digital counting means for resolution of range ambiguities in a multiple pulse repetition frequency Doppler radar comprising:
  a plurality of digital counters corresponding in number to the pulse repetition frequencies of the Doppler radar;
  means setting each counter in accordance with ambiguous range quantities derived from the corresponding pulse repetition frequency in the Doppler radar;
  a pulse source applying pulses to all said counters simultaneously for digitally counting in each repeatedly to a limit from the setting of the counter, the arrival of each counter to its limit producing a pulse output thereof operable to reset the respective counter to a predetermined modulo and repeatedly count from said predetermined modulo set to the limit thereof until coincidence of output pulses from all said counters occurs;
  a coincidence detector coupled in common with said counters for detecting coincidence in count; and
  an inhibiting circuit coupling said pulse source to a last digital counter for counting pulses of said pulse source, said coincidence detector being coupled to said inhibiting circuit to control same to inhibit the passage of pulses to said last counter upon coincidence detection whereby the count of said last counter is a digital number representing true range.

5. A digital counting means as set forth in claim 4 wherein said plurality of digital counters are each set by said means setting each counter to count said pulses from said pulse source down to the "0" state thereof whereby coincidence will occur when all said plurality of digital counters are in the "0" state to produce said coincidence in count.

6. A digital counting means as set forth in claim 5 wherein said pulse source is a frequency stabilized pulse source.

7. A digital counting means for resolution of range ambiguities in a multiple pulse repetition frequency Doppler radar comprising:
  a plurality of digital counters corresponding in number to the number of different pulse repetition frequencies of the Doppler radar, said pulse repetition frequencies each being a harmonic of a fundamental frequency, each digital counter being constructed and arranged to count downward to a preset number at which time it resets to a number in accordance with a modulo, the moduli of all digital counters being in a predetermined relationship with respect to the fundamental frequency;
  means to set each digital counter to a digital count corresponding to the ambiguous range quantity derived from the respective pulse repetition frequency of the Doppler radar;
  an unambiguous range counter;
  a frequency stabilized pulse source coupled to apply pulses therefrom to said plurality of digital counters and to said unambiguous range counter, said plurality of digital counters each being operative in response to pulses from said pulse source to count downward from said set corresponding to the ambiguous range quantity to said preset number and thereafter repeatedly from its reset modulo number, said repeated cycles continuing until coincidence of said preset numbers occurs on outputs of all said plurality of digital counters;
  a coincidence detector coupled in common with said digital counters for detecting said coincidence in the outputs of said plurality of digital counters; and
  an inhibit circuit coupled in the output of said frequency stabilized pulse source and to said coincidence detector to control said inhibit circuit to inhibit the passage of frequency stabilized pulses to said plurality of digital counters and to said unambiguous range counter upon the coincidence detection of said coincidence detector whereby the digital count of pulses of said unambiguous range counter, at the instant interrupted by said inhibit circuit, is representative of unambiguous range of a target producing said ambiguous range quantities.

8. A digital counting means as set forth in claim 7 wherein said frequency stabilized pulses from said frequency stabilized pulse source are equal to the product of the moduli of harmonics of said fundamental frequency and said fundamental frequency.

9. A digital counting means as set forth in claim 7 wherein said plurality of digital counters are in coincidence when each arrives at the "0" state at the same pulse count from said frequency stabilized pulse source.

No references cited.

CHESTER L. JUSTUS, *Primary Examiner.*

R. D. BENNETT, *Assistant Examiner.*

UNITED STATES PATENT OFFICE
CERTIFICATE OF CORRECTION

Patent No. 3,277,473                              October 4, 1966

Charles D. Calhoon, Sr., et al.

It is hereby certified that error appears in the above numbered patent requiring correction and that the said Letters Patent should read as corrected below.

Column 1, line 38, after "echo" insert -- pulse signal with the corresponding transmitted pulse --.

Signed and sealed this 22nd day of August 1967.

(SEAL)
Attest:

ERNEST W. SWIDER                               EDWARD J. BRENNER
Attesting Officer                                     Commissioner of Patents